(12) United States Patent
Girbal

(10) Patent No.: US 11,212,368 B2
(45) Date of Patent: Dec. 28, 2021

(54) FIRE-AND-FORGET OFFLOAD MECHANISM FOR NETWORK-BASED SERVICES

(71) Applicant: NETFLIX, INC., Los Gatos, CA (US)

(72) Inventor: Antoine Jean Girbal, Los Gatos, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 16/416,108

(22) Filed: May 17, 2019

(65) Prior Publication Data

US 2020/0366761 A1 Nov. 19, 2020

(51) Int. Cl.
*H04L 29/06* (2006.01)
*H04L 29/08* (2006.01)

(52) U.S. Cl.
CPC .............. *H04L 67/42* (2013.01); *H04L 67/02* (2013.01); *H04L 69/16* (2013.01); *H04L 67/28* (2013.01)

(58) Field of Classification Search
CPC ...................................................... H04L 67/42
See application file for complete search history.

(56) References Cited

U.S. PATENT DOCUMENTS

| 2003/0154244 A1* | 8/2003 | Zellers | H04L 63/029 |
| | | | 709/203 |
| 2016/0308935 A1* | 10/2016 | Sakai | H04L 67/02 |
| 2017/0048656 A1* | 2/2017 | Kwon | H04L 67/02 |
| 2017/0230442 A1* | 8/2017 | Denoual | H04L 69/22 |

FOREIGN PATENT DOCUMENTS

WO 2018/236795 A1 12/2018

OTHER PUBLICATIONS

International Search Report for application No. PCT/US2020/033268 dated Aug. 18, 2020.

* cited by examiner

*Primary Examiner* — Esther B. Henderson
(74) *Attorney, Agent, or Firm* — Artegis Law Group, LLP

(57) ABSTRACT

In various embodiments, a proxy application processes requests associated with a network-based service. In operation, the proxy application determines that a first request received from a client application indicates that a response to the first request can be offloaded from a server machine. Prior to transmitting the first request to the server machine, the proxy application transmits a response to the first request to the client application. The response indicates that the server machine has successfully processed the first request. Advantageously, upon receiving the response, the client application is able to initiate a second request irrespective of the server machine.

20 Claims, 4 Drawing Sheets

FIRE-AND-FORGET OFFLOAD MECHANISM FOR NETWORK-BASED SERVICES

BACKGROUND

Field of the Various Embodiments

Embodiments of the present invention relate generally to client-server architectures and, more specifically, to a fire-and-forget offload mechanism for network-based services.

Description of the Related Art

Many client applications access network-based services using version 1.0 or 1.1 ("1.x") of the Hypertext Transfer Protocol ("HTTP") over Transmission Control Protocol ("TCP"). In so doing, a client application interacts with a network-based service via HTTP transactions that are transmitted over TCP connection(s) between the client application and the network-based service. A typical client application initiates a relatively small number of interactive HTTP transactions and a relatively large number of informational HTTP transactions. In an interactive HTTP transaction, the client application downloads data, such as display information for a home page, that needs to be provided to a user who is interacting with the client application. In an informational HTTP transaction, a client application uploads data to one or more server machines that the network-based service uses for informational purposes. For example, the client application could upload event logs, metric logs that indicate the performance of the client application, and/or "heartbeats" that indicate that the client application is properly executing.

One drawback to using HTTP/1.x over TCP is that the volume of informational HTTP transactions can significantly delay the transmission and processing of the interactive HTTP transactions associated with a given client application. In HTTP/1.x over TCP, each HTTP transaction requires a dedicated TCP connection. Further, the client platforms on which client applications execute oftentimes limit the number of concurrent TCP connections to between two and six connections. And, as is well-understood, upload speeds usually are slower than download speeds. Consequently, at various points in time, all of the available TCP connections can be allocated to only informational HTTP transactions. Any pending interactive HTTP transactions must wait until one of the informational HTTP transactions, including the relative slow upload portion of the HTTP transaction, completes. The resulting delay in downloading data associated with the pending interactive HTTP transaction can cause a degradation in the overall user experience.

In an effort to address the above problems, some client applications allocate at least one of the available TCP connections to informational HTTP transactions, while allocating the other TCP connections to interactive HTTP transactions. However, with this approach, the number of TCP connections available to interactive HTTP transactions is automatically reduced irrespective of the actual volume of informational HTTP transactions. In cases where the volume of interactive HTTP transactions is relatively low, such reductions can be undesirable. Further, if the capacity of the TCP connection(s) allocated to informational HTTP transactions is exceeded, then the client application may end up dropping the information being transmitted to the network-based service via the informational HTTP transactions.

In another approach to addressing the above problems, some client applications implement HTTP/2, where multiple HTTP transactions can be multiplexed over each TCP connection. Because a client application can initiate any number of interactive HTTP transactions concurrently with any number of informational HTTP transactions over each TCP connection when implementing HTTP/2, delays in downloading data that needs to be provided to the user via one or more interactive HTTP transactions can be reduced. However, some client platforms do not support HTTP/2, which reduces the efficacy of this avenue of solution.

As the foregoing illustrates, what is needed in the art are more effective techniques for processing requests associated with network-based services.

SUMMARY

One embodiment of the present invention sets forth a computer-implemented method for processing requests associated with a network-based service. The method includes determining that a first request received from a client application indicates a response to the first request can be offloaded from a server machine; and prior to transmitting the first request to the server machine, transmitting a first response to the first request to the client application indicating that the server machine has successfully processed the first request, where, upon receiving the first response, the client application is able to initiate a second request.

At least one technical advantage of the disclosed techniques relative to the prior art is that, with the disclosed techniques, interactive HTTP transactions are less likely to be delayed by informational HTTP transactions for a client application that implements HTTP/1.x over TCP. In particular, as soon as the proxy server responds to an informational HTTP transaction transmitted from the client application, the client application can close or reuse the associated TCP connection without having to wait for a response from the back-end server. Accordingly, the client application is less likely to use all available TCP connections for informational HTTP transactions and delay the transmission and processing of interactive HTTP transactions. These technical advantages represent one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
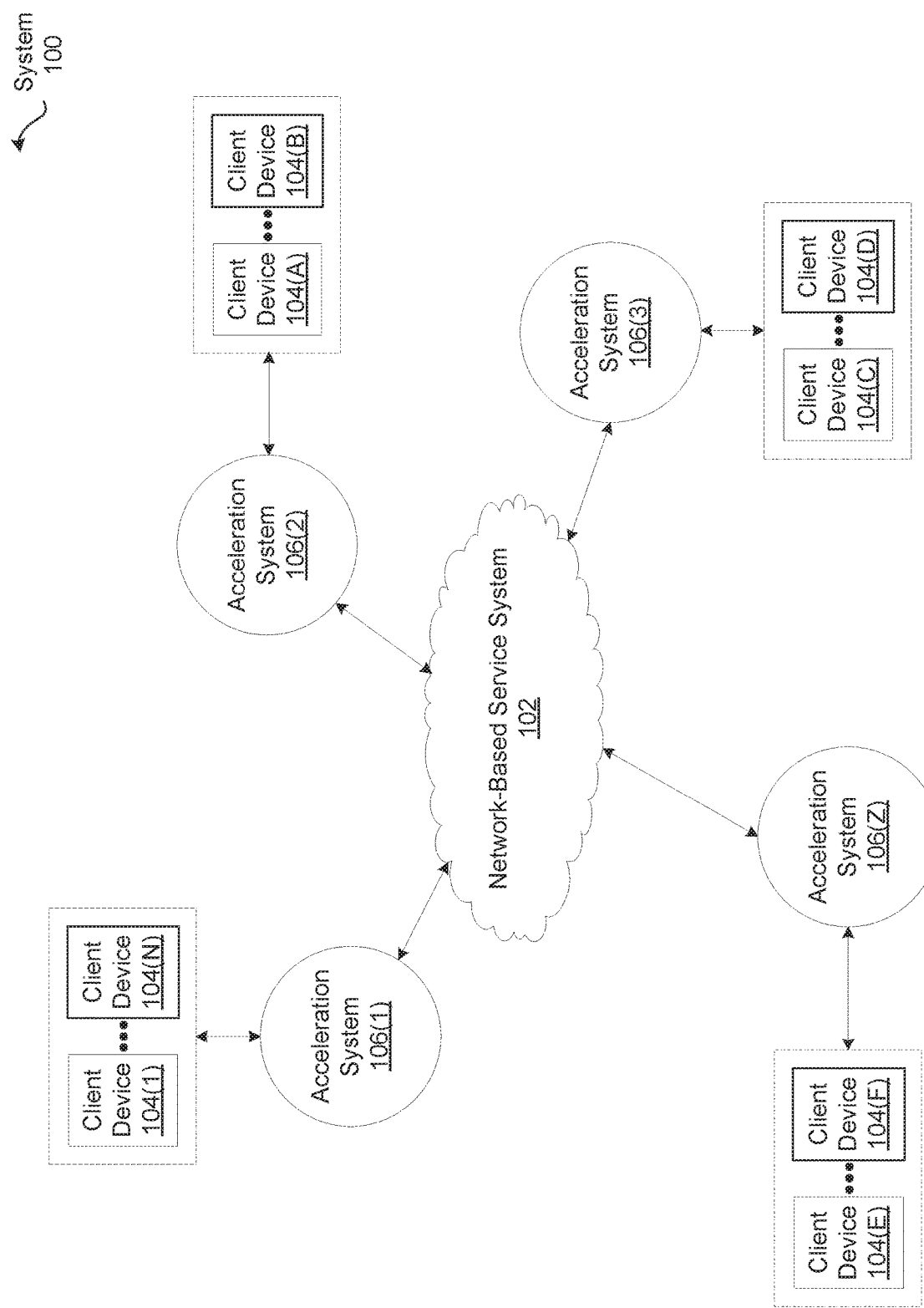
FIG. 1 is a conceptual illustration of a system configured to implement one or more aspects of the present invention.

In the following description, numerous specific details are set forth to provide a more thorough understanding of the various embodiments. However, it will be apparent to one of skilled in the art that the inventive concepts may be practiced without one or more of these specific details.

Users typically interact with a media streaming service via client applications executing on Internet-connected client devices. For example, a client application executing on a smart television could allow users to browse, search, select, download, and stream media content provided by the media streaming service. Many client applications access the media streaming service using HTTP/1.x over TCP. In so doing, a client application interacts with the media streaming service via HTTP transactions. A typical client application initiates a relatively small number of interactive HTTP transactions and a relatively large number of informational HTTP transactions. In an interactive HTTP transaction, the client application downloads data, such as display information for a home page, that needs to be provided to a user who is interacting with the client application. In an informational HTTP transaction, a client application uploads data to one or more server machines that the media streaming service uses for informational purposes. For example, the client application could upload event logs, metric logs that indicate the performance of the client application, and/or "heartbeats" that indicate that a streaming session is active.

One drawback to using HTTP/1.x over TCP is that the volume of informational HTTP transactions can significantly delay the transmission and processing of the interactive HTTP transactions associated with a given client application. In HTTP/1.x over TCP, each HTTP transaction requires a dedicated TCP connection. Further, the client platforms on which client applications execute oftentimes limit the number of concurrent TCP connections to between two and six connections. And, as is well-understood, upload speeds usually are slower than download speeds. For example, an Internet Service Provider ("ISP") could provide a tier of service with upload speeds up to 5 Megabits per second ("Mbps") vs download speeds up to 250 Mbps. Consequently, at various points in time, all of the available TCP connections can be allocated to only informational HTTP transactions. Any pending interactive HTTP transactions must wait until one of the informational HTTP transactions, including the relative slow upload portion of the HTTP transaction, completes. The resulting delay in downloading data associated with the pending interactive HTTP transaction can cause a degradation in the overall user experience. For example, instead of waiting 50 milliseconds to view information associated with a selected video, a user could wait 1 second.

With the disclosed techniques, however, interactive HTTP transactions are less likely to be delayed by informational HTTP transactions for client applications that implement HTTP/1.x over TCP. In one embodiment, a proxy application executes on a proxy server that acts as an intermediary between one or more client applications and a back-end sever that provides the media streaming service. The proxy server and the back-end server communicate via HTTP/2 over TCP, where multiple HTTP transactions can be multiplexed over each TCP connection.

In some embodiments, the client application adds a "fire-and-forget" header to each request that initiates an informational HTTP transaction. Upon receiving a request, the proxy application determines whether to activate offloading for the request based on whether the request includes a fire-and-forget header. If the proxy application activates offloading for the request, then the proxy application transmits a successful generic response to the client application prior to transmitting the request to the back-end server. The successful generic response intentionally and erroneously indicates that the back-end server has successfully processed the request. Irrespective of whether offloading is active for the request, the proxy application transmits the request to the back-end server. If offloading is active, then the proxy application discards the response received from the back-end server. Otherwise, the proxy application transmits the response received from the back-end server to the client application.

At least one technical advantage of the disclosed techniques relative to the prior art is that, with the disclosed techniques, interactive HTTP transactions are less likely to be delayed by informational HTTP transactions for a client application that implements HTTP/1.x over TCP. In particular, as soon as the proxy server responds to an informational HTTP transaction transmitted from the client application, the client application can close or reuse the associated TCP connection without having to wait for a response from the back-end server. Accordingly, the client application is less likely to use all available TCP connections for informational HTTP transactions and delay the transmission and processing of interactive HTTP transactions. As a result, a typical user experience provided by the media streaming service via the client application is improved. These technical advantages represent one or more technological advancements over prior art approaches.

System Overview

FIG. 1 is a conceptual illustration of a system 100 configured to implement one or more aspects of the present invention. As shown, the system 100 includes, without limitation, a network-based service system 102, any number of client devices 104, and any number of acceleration systems 106. For explanatory purposes, multiple instances of like objects are denoted with reference numbers identifying the object and parenthetical numbers identifying the instance where needed.

The network-based service system 102, the client devices 104, and the acceleration systems 106 communicate over a communications network (not shown). The communications network includes a plurality of network communications systems, such as routers and switches, configured to facilitate data communication. Persons skilled in the art will recognize that many technically feasible techniques exist for building the communications network, including technologies practiced in deploying the well-known Internet communications network.

The network-based service system 102 includes, without limitation, a network of interconnected nodes that are distributed across the globe and receive, transmit, process, and/or store data associated with a network-based service (e.g., a streaming media service). The interconnected nodes may include any suitable combination of software, firmware, and hardware to perform these desired functions. In particular, the network-based service system 102 includes multiple computing devices that may be co-located or physically distributed from one another. For example, these computing devices could include one or more general-purpose PCs, Macintoshes, workstations, Linux-based computers, server computers, one or more server pools, or any other suitable devices. The computing devices store and execute one or more programs that are remotely accessible in any technically feasible fashion, such as via corresponding application programming interfaces ("APIs"). In various embodiments, any number of the computing devices may be implemented in one or more cloud computing environments (i.e., encapsulated shared resources, software, data, etc.).

Each client device 104 may be any type of device that is capable of executing software applications and communicating with other devices via the communication network. For example, the client device 104(1) could be a tablet, a set-top box, a smart television, a game console, a streaming media player, a mobile device such as a smart phone, etc The client devices 104 may be distributed across any number of physical locations. Each of the client devices 104 may include any appropriate input devices (such as a keypad, touch screen, mouse, or other device that can accept information), output devices, mass storage media, or other suitable components for receiving, processing, storing, and communicating data. Both the input device and output device may include fixed or removable storage media such as a magnetic computer disk, CD-ROM. Each client device 104 may include, without limitation, any number of processors and any number of memories in any combination. Any number of the client devices 104 may provide a multiprocessing environment in any technically feasible fashion.

Each client device 104 includes computer hardware and/or computer software that relies on the network-based service system 102 for certain operations. In particular, each client device 104 may include any number of client platforms that each execute any number of software applications. Examples of client platforms include, without limitation, web browsers, smart television operating systems (OSs), mobile phone OSs, video game console OSs, etc. Software applications that communicate with the network-based service system 102 over the communications network to perform various operations are referred to herein as "client applications."

In some embodiments, a client application operates by issuing requests to the network-based service system 102. The client device 104 establishes a network connection with the network-based service system 102 and then transmits the request to the network-based service system 102 via the network connection. In response to receiving the request, the network-based service system 102 processes the request and generates a response that is transmitted back to the client application via the network connection. The process of issuing a request and receiving a corresponding response is referred to herein as a "transaction." The round trip between the client application executing on the client 104, and the portion of the network-based service system 102 that processes the request, is referred to herein as the transaction round trip. In general, the farther the client 104 is from the portion of the network-based service system 102 that processes the request, the higher the latency of the transaction round trip. Further, the higher the congestion of the network connection, the higher the latency of the transaction round trip.

The acceleration systems 106 operate as an intermediary between the network-based service system 102 and the client devices 104 to reduce the transaction round trip latencies. The acceleration systems 106 include a network of interconnected systems that are distributed across the globe and that each operates as an intermediary between the client devices 104 and the network-based service system 102. A given acceleration system 106 establishes a network connection with a given client device 104 and receives a request over the connection. The acceleration system 106 facilitates the processing of the request over a network connection with the network-based service system 102.

In various embodiments, any number of the acceleration systems 106 may be embedded within a network associated with an Internet Service Provider ("ISP"). In some such embodiments, if the acceleration system 106(x) is embedded within a network associated with an ISP, then the acceleration system 106(x) is accessible only by the client devices 104 that are associated with and/or subscribe to the ISP. In the same or other embodiments, any number of the acceleration systems 106 may operate within or in association with an Internet exchange point and independent of an ISP. An Internet exchange point is a physical infrastructure through which ISPs and content delivery networks ("CDNs") exchange Internet traffic.

When an acceleration system 106 operates as an intermediary between the network-based service system 102 and the client device 104, the time required to execute transactions is reduced for at least two reasons. First, in some embodiments, the acceleration system 106 is generally physically closer to the client device 104 relative to the network-based service system 102. Thus, any round trip times needed to establish the network connection between the client device 104 and the acceleration system 106 are shorter relative to if the network connection needed to be established between the client device 104 and the network-based service system 102. Second, in some embodiments, due to the acceleration system 106 having a large volume of requests originating from multiple client devices 104, the acceleration system 106 has a consistent, pre-established, and pre-authenticated network connection with the network-based service system 102. Thus, a network connection with the network-based service system 102 need not be established and authenticated for each request.

It will be appreciated that the system 100 shown herein is illustrative and that variations and modifications are possible. For example, the connection topology between the various components of the system 100 may be modified as desired. Note that the techniques described herein are illustrative rather than restrictive, and may be altered without departing from the broader spirit and scope of the invention. In various embodiments, any number of the techniques disclosed herein may be implemented while other techniques may be omitted in any technically feasible fashion.

Figure 2:
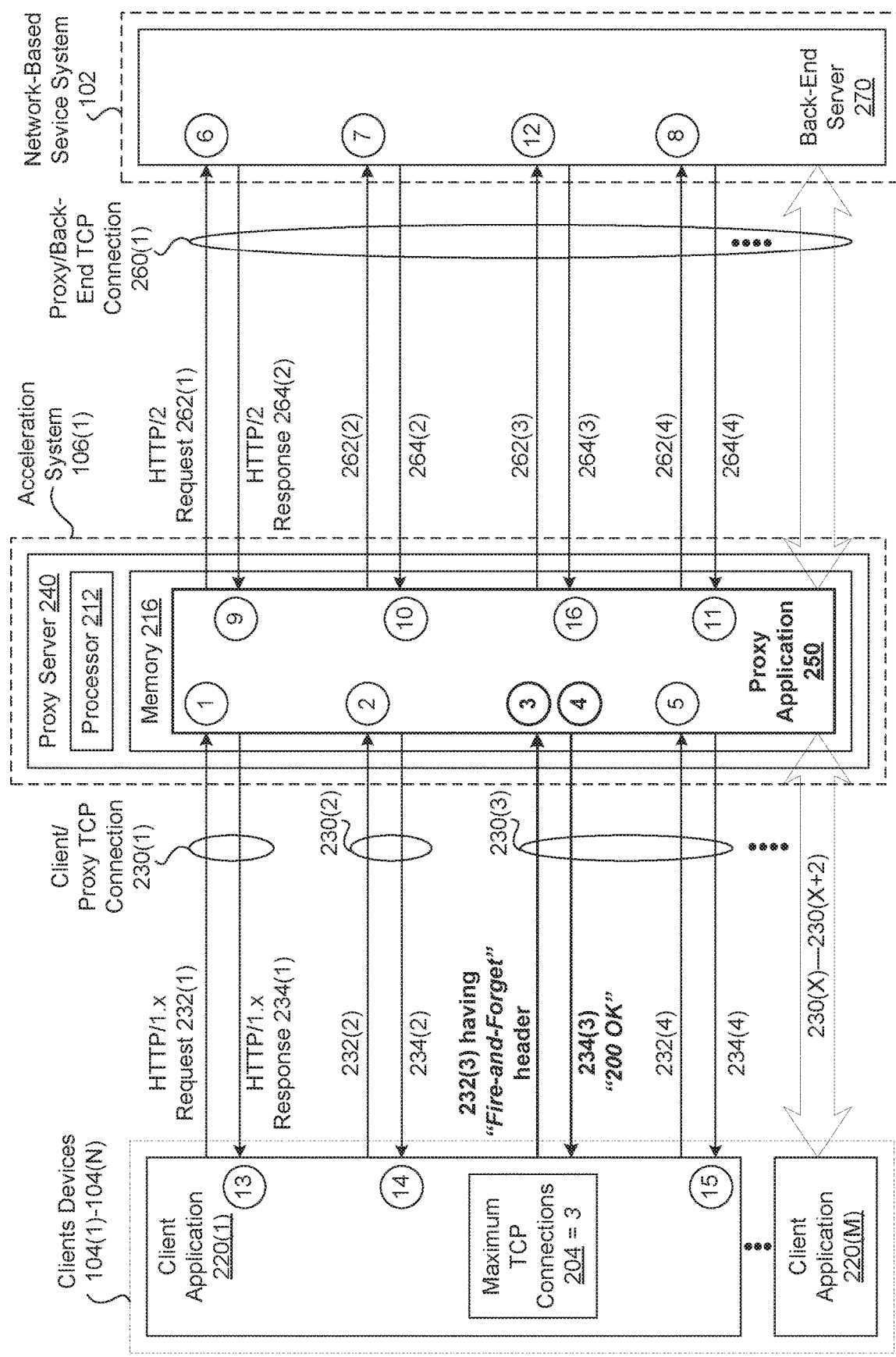
FIG. 2 is a more detailed illustration of one of the acceleration systems of FIG. 1 during operation, according to various embodiments of the present invention.
Figure 3:
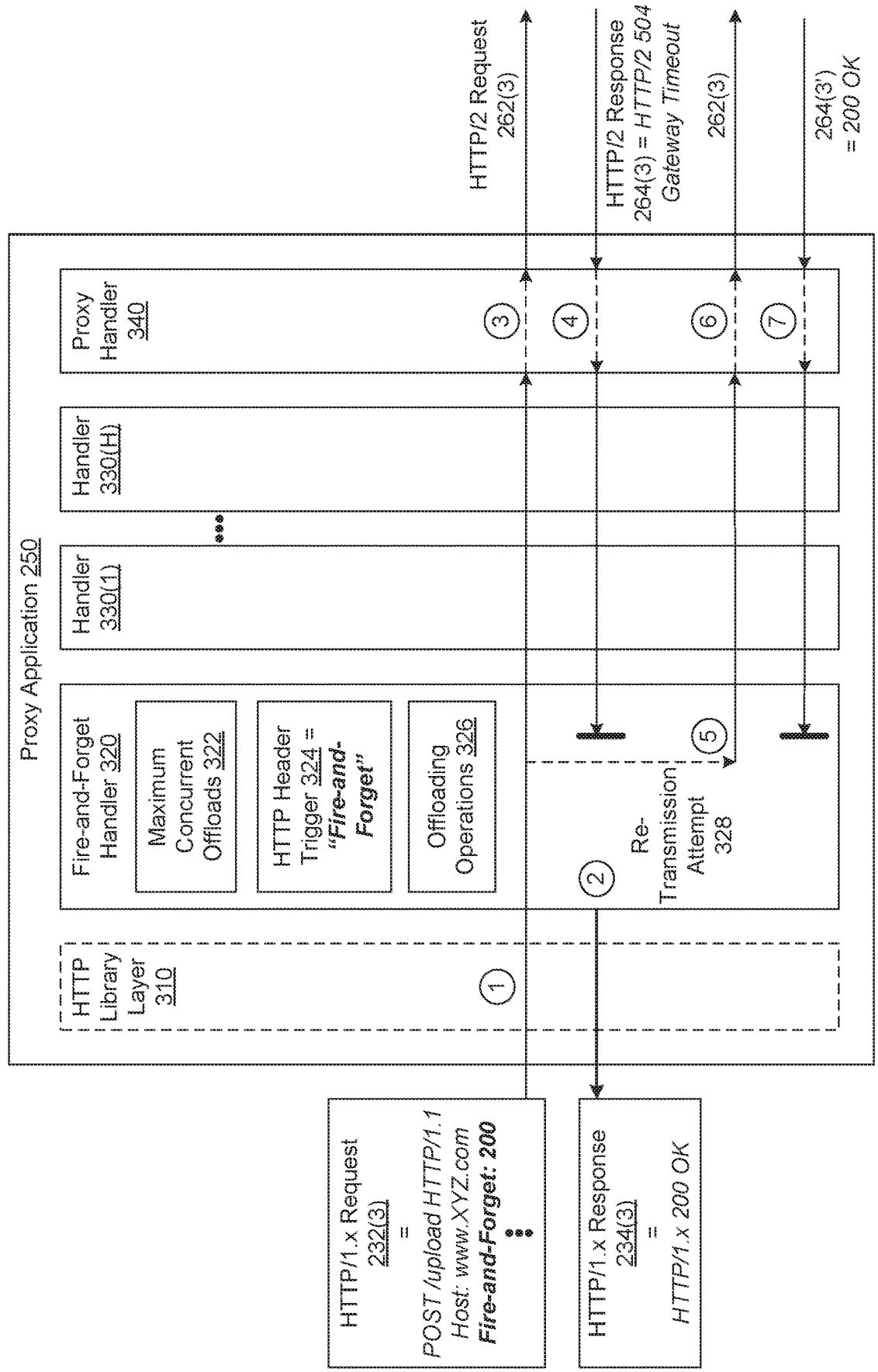
FIG. 3 is a more detailed illustration of the proxy application of FIG. 2, according to various embodiments of the present invention.
Figure 4:
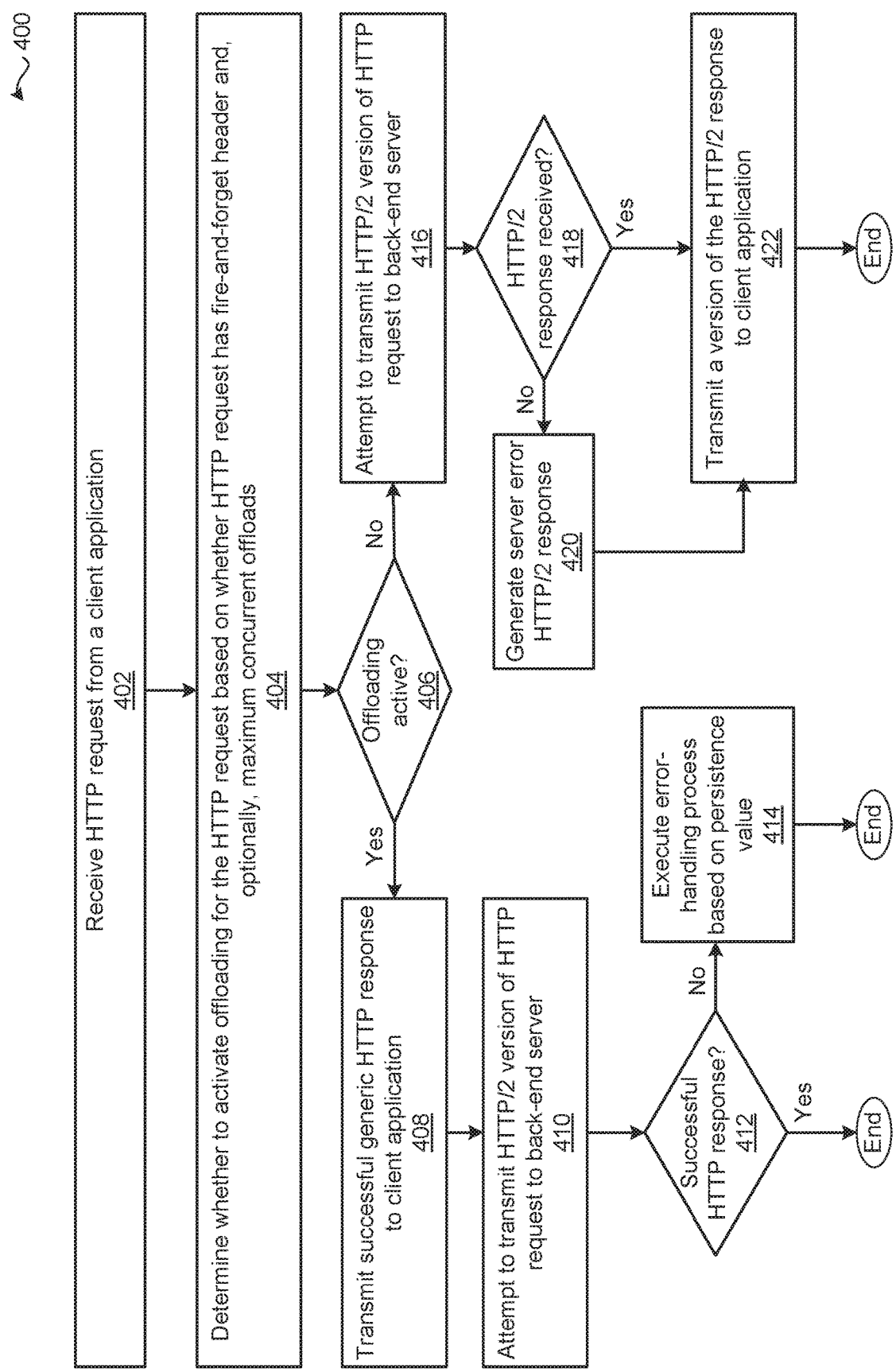
FIG. 4 is a flow diagram of method steps for processing a request associated with a network-based service, according to various embodiments of the present invention.

For explanatory purposes only, FIGS. 2-4 describe the functionality of the system 100 in the context of TCP connections and specific versions of the HTTP protocol. However, the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques.

FIG. 2 is a more detailed illustration of one of the acceleration systems 106 of FIG. 1 during operation, according to various embodiments of the present invention. More precisely, FIG. 2 illustrates interactions between any number of client applications 220(1)-220(M) executing on any number of client devices 104(1)-104(N), a proxy server 240 included in the acceleration system 106(1), and a back-end server 270 included in the network-based service system 102.

The back-end server 270 includes, without limitation, any number of the computing devices included in the network-based service system 102. Each of the computing devices may execute any number and type of software applications that process and respond to HTTP requests for the network-based service system 102.

The proxy server 240 is a computing device included in the acceleration system 106(1). In alternate embodiments, the proxy server 240 may include any number of the computing devices included in the acceleration system 106(1). As shown, the client devices 104 and the proxy server 240 communicate using HTTP/1.1 over client/proxy TCP connections 230. The proxy server 240 and the back-end server 270 communicate using HTTP/2 over proxy/back-end TCP connections 260. In operation, the proxy server 240 acts an intermediary between the client devices 104(1)-104(N) and the back-end server 270 to reduce the time required to execute HTTP transactions. The proxy server 240 is sometimes referred to as a "reverse proxy server."

The proxy server 240 reduces the time required to execute HTTP transactions for at least three reasons. First, the proxy server 240 is generally physically closer to the client devices 104(1)-104(N) relative to the back-end server 270. In particular, in some embodiments, the proxy server 240 is embedded within a network associated with an ISP that is also associated with the client devices 104(1)-104(N). Thus, any round trip times needed to establish the network connection between the client device 104 and the proxy server 240 are shorter relative to if the network connection needed to be established between the client device 104 and the back-end server 270. Second, in some embodiments, due to the proxy server 240 having a large volume of requests originating from multiple client devices 104, the proxy server 240 has any number of consistent, pre-established, and pre-authenticated proxy/back-end TCP connections 260 with the back-end server 270. Thus, a TCP connection with the back-end server 270 need not be established and authenticated for each HTTP request.

Third, the proxy server 240 and the back-end server 270 communicate using HTTP/2. As is well known, HTTP/2 implements a wide variety of performance improvements relative to HTTP/1.x In particular, in HTTP/2 multiple HTTP transactions are multiplexed over each connection (e.g., the proxy/back-end TCP connection 260(1)). Accordingly, the number of concurrent HTTP interactions is not necessarily limited. In some embodiments, the proxy server 240 establishes a concurrency limit that is not likely to be reached during normal operation. For instances, in some embodiments, the proxy server 240 connects to the back-end server 270 via two proxy/back-end TCP connections 260(1) and 260(2) and establishes a concurrency limit of fifty concurrent HTTP transactions per TCP connection. Accordingly, up to 100 HTTP transactions between the proxy server 240 and the back-end server 270 may execute concurrently.

As shown, the proxy server 240 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing. In alternate embodiments, the proxy server 240 may include, without limitation, any number of processors 112 and any number of memories 116 in any combination. In the same or other embodiments, any number of computing devices included in the proxy server 240 may provide a multiprocessing environment in any technically feasible fashion.

The proxy server 240 is configured to implement one or more applications that enable the client applications 220 to access the network-based service via the back-end server 270. Each application is described as residing in a single memory 116 of the proxy server 240 and executing on a single processor 112 of the proxy server 240. However, as persons skilled in the art will recognize, the functionality of each application may be distributed across any number of other applications that reside in the memories 116 of any number of compute devices and execute on the processors 112 of any number of compute devices. Further, the functionality of any number of applications may be consolidated into a single application or subsystem.

Each of the client applications 220 accesses the network-based service system 102 using HTTP 1.x over TCP. In so doing, each of the client applications 220 interacts with the proxy server 240 over one or more of the client/proxy TCP connections 230. Each client/proxy TCP connection 230 connects one of the client applications 220 executing on one of the client devices 104 to the proxy server 240. As shown for the client application 220(1), each of the client applications 220 is associated with a maximum TCP connections 204. The maximum TCP connections 204(1) specifies the maximum number of TCP connections that the client application 220(1) can have to each network based service system 102. Typically, the maximum TCP connections 204 is set and enforced by the client platform (e.g., web browser, smart television operation system, etc.) that executes the client application 220. For explanatory purposes only, the maximum TCP connections 204 for the client application 220(1) is three. Accordingly, the client application 220(1) may establish at most three client/proxy TCP connections 230.

In HTTP/1.x over TCP, each HTTP transaction requires a dedicated TCP connection. A typical client application 220 initiates a relatively small number of interactive HTTP transactions and a relatively large number of informational HTTP transactions. In an interactive HTTP transaction, the client application 220 downloads data, such as display information for a home page, that needs to be provided to a user who is interacting with the client application 220. In an informational HTTP transaction, the client application 220 uploads data to the back-end server 270 that the network-based service system 102 uses for informational purposes. For example, the client application 220 could upload event logs, metric logs that indicate the performance of the client application 220, and/or "heartbeats" that indicate that the client application 220 is properly executing.

One drawback to using HTTP/1.x over TCP is that the volume of informational HTTP transactions can significantly delay the transmission and processing of the interactive HTTP transactions associated with a given conventional client application. Not only is the conventional client application limited to a maximum number of TCP connections, but also upload speeds usually are slower than download speeds. Consequently, at various points in time, all of the available TCP connections can be allocated to only informational HTTP transactions. Any pending interactive HTTP transactions must wait until one of the informational HTTP transactions, including the relative slow upload portion of the HTTP transaction, completes. The resulting delay in downloading data associated with the pending interactive HTTP transaction can cause a degradation in the overall user experience.

As described previously herein, efforts to address the above problems automatically reduce the number of TCP connections available to interactive HTTP transactions, increase the risk of dropping information being transmitted to the network-based service via the informational HTTP transactions, and/or have limited applicability.

Offloading the Back-End Server

To more effectively address the above problems, the proxy server 240, includes, without limitation, a proxy application 250. As shown, the proxy application 250 resides in the memory 116 and executes on the processor 112 of the proxy server 240. While acting as an intermediary between the client applications 220 and the back-end server 270, the proxy application 250 selectively offloads, from the back-end server 270, responding to any number of HTTP requests for informational uploads. An HTTP request for an informational upload and the corresponding HTTP response are referred to herein as an informational HTTP transaction.

When generating an HTTP/1.x request 232($x$), if a corresponding HTTP/1.x response 234($x$) is unimportant to the client application 220, then the client application 220 can add a "fire-and-forget" header to the HTTP/1.x request 232($x$). As persons skilled in the art will recognize, the HTTP/1.x request 232($x$) for which the corresponding HTTP/1.x response 234($x$) is unimportant to the client application 220 typically specifies an HTTP method used to upload data, such as "POST" or "PUT."

The fire-and-forget header indicates to the proxy application 250 that responding to the HTTP/1.x request 232($x$) can be offloaded from the back-end server 270 to the proxy application 250. Note that the only impact that an informational HTTP interaction typically has on the associated client application 220 is potentially delaying other HTTP interactions, thereby reducing the performance of the client application 220. For this reason, in some embodiments, the client applications 220 add a fire-and-forget header to each HTTP/1.x request 232 that initiates an informational HTTP interaction.

The fire-and-forget header includes, without limitation, a name "Fire-and-Forget" and a success code list (one or more values for a success code parameter). The name "Fire-and-Forget" indicates that the corresponding HTTP/1.x response 234($x$) is unimportant. The success code list specifies one or more status codes that each indicate that the HTTP/1.x response 234($x$) is successful. For example, the success code list for a fire-and-forget header in the HTTP/1.x request 232($x$) could specify "200, 204," and the success code list of a fire-and-forget header in the HTTP/1.x request 232($y$) could specify "200."

If the HTTP/1.x request 232($x$) includes a fire-and-forget header, then the HTTP/1.x request 232($x$) is associated with a persistence level that correlates to a level of importance associated with the HTTP/1.x request 232($x$). The persistence level for the HTTP1.x request 232($x$) can be specified via a "persistence" header that is included in the HTTP1.x request 232($x$). If the HTTP1.x request 232($x$) does not include a persistence header, then the HTTP1.x request 232($x$) is associated with a default persistence level.

The persistence header includes, without limitation, a name "Persistence" and a persistence level (a value for a persistence parameter). Each allowed persistence level is associated with a different error-handling process that the proxy application 250 is to perform if the back-end server 270 does not successfully process a version of the associated HTTP request 232. More precisely, the persistence level for the HTTP request 232($x$) specifies the error handling process that the proxy application 260 is to perform if the back-end server is unable to successfully process an HTTP.2 request 262($x$). The HTTP/2 request 262($x$) is an HTTP/2 version of the HTTP/1.x request 232($x$).

Upon receiving the HTTP/1.x request 232($x$) from one of the client applications 220, the proxy application 250 determines whether to activate offloading for the HTTP/1.x request 232($x$). In some embodiments, the proxy application 250 activates offloading for the HTTP/1.x request 232($x$) if the HTTP/1.x request 232($x$) includes a fire-and-forget header. In other embodiments, the proxy application 250 may determine whether to activate offloading for the HTTP/1.x request 232($x$) based on whether the HTTP/1.x request 232($x$) includes a fire-and-forget header and any number of additional criteria.

For instance, in various embodiments, the proxy application 250 determines whether to activate offloading for the HTTP/1.x request 232($x$) based on whether the HTTP/1.x request 232($x$) includes a fire-and-forget header and a maximum concurrent offloads (not shown in FIG. 1). The maximum concurrent offloads specifies a maximum number of HTTP/1.x requests 232 for which offloading may be active at any given time. If the HTTP/1.x request 232($x$) includes the fire-and-forget header and the total number of HTTP1.x requests 232 for which offloading is active is less than the maximum concurrent offloads, then the proxy application 250 activates offloading for HTTP/1.x request 232($x$). Otherwise, the proxy application 250 does not activate offloading for the HTTP/1.x request 232($x$). The proxy application 250 may track and activate offloading in any technically feasible fashion.

For instance, in some embodiments and as described in greater detail in conjunction with FIG. 3, the proxy application 250 is written in the Go language and each HTTP/1.x request 232 is processed via a different execution thread. The offloading functionality is included in an HTTP.handler that limits the number of threads executing the offloading functionality to the maximum concurrent offloads.

If offloading is active for the HTTP/1.x request 232($x$), then the proxy application 250 transmits a "successful" generic HTTP/1.x response 234($x$) to the client application 220 using the client/proxy TCP connection 230 over which the HTTP/request 232($x$) was received. The client application 220 may then reuse or close the client/proxy TCP connection 230. The successful generic HTTP/1.x response 234($x$) purposely and erroneously indicates that the back-end server 270 has successfully processed the HTTP/1.x request 232($x$). The proxy application 250 may generate the successful generic HTTP/1.x response 234($x$) in any technically feasible fashion.

For instance, in some embodiments, the proxy application 250 generates a successful generic HTTP/1.x response 234($x$) that includes one of the status codes specified in the success code list of the fire-and-forget header of the HTTP/1.x request 232($x$). For example, if the success code list includes the status code of 200, then the proxy application 250 could generate the successful generic HTTP/1.x response 234(x) having a "200 OK" HTTP status line and an empty body. As persons skilled in the art will recognize, an "HTTP status line" is a status code (e.g., 200) accompanied by an associated reason phrase (e.g., "OK"). The status code of 200 indicates that the back-end server 270 has successfully processed the HTTP/1.x request 232(x). In another example, if the success code list includes the status code of 204, then the proxy application 250 could generate the successful generic HTTP/1.x response 234(x) having a "204 No Content" HTTP status line. The status code of 204 indicates that the back-end server 270 has successfully processed the HTTP/1.x request 232(x) and is not returning any content.

Subsequently, irrespective of whether offloading is active for the HTTP/1.x request 232(x), the proxy application 250 converts the HTTP/1.x request 232(x) to the HTTP/2 request 262(x). The HTTP/2 request 262(x) is an HTTP/2 version of the HTTP/1.x request 232(x). The proxy application 250 may convert the HTTP/1.x request 232(x) to the HTTP/2 request 262(x) in any technically feasible fashion. The proxy application 250 then attempts to transmit the HTTP/2 request 262(x) to the back-end server 270 via one of the proxy/back-end TCP connections 260. In contrast to the HTTP/1.x transactions, because any number of the HTTP/2 requests 262 and any number of HTTP/2 responses 264 can share each of the proxy/back-end TCP connections 260, any number of HTTP/2 transactions may execute concurrently.

If offloading is not active for the HTTP/2 request 262(x) and the proxy application 250 successfully receives an HTTP/2 response 264(x) from the back-end server 270, then the proxy application 250 converts the HTTP/2 response 264(x) to the HTTP1.x response 234(x). The HTTP/1.x response 234(x) is an HTTP/1.x version of the HTTP/2 response 264(x). The proxy application 250 may convert the HTTP/2 response 264(x) to the HTTP1.x response 234(x) in any technically feasible fashion. The proxy application 250 then transmits the HTTP/1.x response 234(x) to the proxy application 250 using the client/proxy TCP connection 230 over which the HTTP/request 232(x) was received. The client application 220 may then reuse or close the client/proxy TCP connection 230.

If offloading is not active for the HTTP/2 request 262(x) and the proxy application 250 does not receive the HTTP/2 response 264(x) from the back-end server 270, then the proxy application 250 generates a "server error" HTTP/2 response 264(x). The proxy application 250 may not receive the HTTP/2 response 262(x) from the back-end server 270 for a variety of reasons. For example, the back-end server 270 could be overloaded. The server error HTTP response 264(x) indicates that the HTTP/1.x request 232(x) has not succeeded because of a server error. For instance, in some embodiments, the server error HTTP response 264(x) has a "502 Bad Gateway" HTTP status line. The status code of 502 indicates that the proxy server 240 received an invalid response from the back-end server 270.

If offloading is active for the HTTP/2 request 262(x) and the proxy application 250 receives the HTTP/2 response 264(x) indicating success from the back-end server 270, then the proxy application 250 discards the HTTP/2 response 264(x). The proxy application 250 may determine whether the HTTP/2 response 264(x) indicates success in any technically feasible fashion. For instance, in some embodiments, the proxy application 250 determines whether the HTTP/2 response 264(x) indicates success based on the success code list associated with the HTTP/1 request 232(x). If the status code included in the HTTP/2 response 264(x) matches one of the status codes included in the success code list, then the proxy application 250 determines that the HTTP/2 response 264(x) indicates success. Otherwise, the proxy application 250 determines that the HTTP/2 response 264(x) does not indicate success.

If offloading is active for the HTTP/2 request 262(x) and the proxy application 250 does not receive an HTTP/2 response from the back-end server 270, then the proxy application 250 executes an error-handling process as per the persistence level. Similarly, if offloading is active for the HTTP/2 request 262(x) and the proxy application 250 receives the HTTP/2 response 264(x) that does not indicate success from the back-end server 270, then the proxy application 250 executes an error-handling process as per the persistence level.

The proxy application 250 may implement any number and type of error-handling processes based on any number and type of acceptable persistence levels in any technically feasible fashion. For instance, in some embodiments, the acceptable persistence levels are "low," "medium," "high" (the default persistence level), and "durable." If the persistence level for the HTTP/1.x request 232(x) is low, then the proxy application 250 performs no further operations with respect to the HTTP/1.x request 232(x). If the persistence level is medium, then the proxy application 250 performs at most three re-transmission attempts at relatively short intervals. A re-transmission attempt is an attempt to re-transmit the HTTP/2 request 262(x) to the back-end server 270.

If the persistence level is high, then the proxy application 250 performs re-transmission attempts until the proxy application 250 receives an HTTP/2 response 264(x) indicating success from the back-end server 270. Note that if the maximum concurrent offloads is reached, then the proxy application 250 no longer activates offloading and instead performs synchronous proxy operations. Consequently, a persistence level of high does not cause a backlog in the proxy application 250.

If the persistence level is durable, then the proxy application 250 writes the HTTP/2 request 262(x) to persistent storage (e.g., disk) to survive across restarts and performs re-transmission attempts until the proxy application 250 receives an HTTP/2 response 264(x) indicating success from the back-end server 270. If, at any point during the error handling process, the proxy application 250 receives an HTTP/2 response 264(x) indicating success from the back-end server 270, then the proxy application 250 discards the HTTP/2 response 264(x) and terminates the error-handling process.

Each client application 220 may determine the persistence level for each HTTP/1.x request 232 in any technically feasible fashion. For instance, in some embodiments, since heartbeats occur relatively frequently, the client applications 220 include a persistence header specifying a persistence level of low in each HTTP/1.x request 232 that involves uploading heartbeats. Because event logs and metric logs are typically generated less frequently, the client applications 220 do not include a persistence header in HTTP/1.x requests 232 that involve uploading event logs or metric logs, thereby defaulting the associated persistence levels to high.

For explanatory purposes only, FIG. 2 depicts a series of interactions between the client application 220(1), the proxy application 250, and the back-end server 270 as a series of numbered bubbles. The client application 220(1) executes on the client device 104(1) and has the max connections 204(1) of three.

To interact with the network-based service system 102, the client application 220(1) generates four HTTP/1.x requests 232(1)-232(4). Each of the HTTP/1.x requests 232(1)-232(4) specifies the network-based service system 102 as the host. Each of the HTTP/1.x requests 232(1), 232(2), and 232(4) is a request for a download and does not include a fire-and-forget header. By contrast, the HTTP/1.x request 232(3) is a request for an upload of an event log and includes a fire-and-forget header. The client application 220(1) then attempts to transmit the HTTP/1.x requests 232(1)-232(4) to the proxy application 250.

Because the client application 220(1) is limited to at most three TCP connections, the client device 104 generates three client/proxy TCP connections 230(1)-(3) for, respectively, the HTTP/1.x requests 232(1)-232(3). Because each of the HTTP/1.x requests 232 requires a dedicated client/proxy TCP connection 230 and all of the available client/proxy TCP connections 230 are in use, the transmission of the HTTP/1.x request 232(4) is delayed.

To generate the client/proxy TCP connection 230(x) for the HTTP/1.X request 232(x), the client device 104(1) and the proxy server 240 perform a TCP handshake followed by a transport layer security ("TLS") handshake. The TCP handshake is the mechanism by which the client device 104 and the proxy server 240 negotiate and start a TCP communication session for communicating with one another. The TLS handshake is the mechanism by which the client device 104(1) and the proxy server 240 exchange the security keys needed to establish a secure communication session.

As depicted with the bubbles numbered 1-3, the proxy application 250 receives the HTTP/1.x requests 232(1)-232(3) over, respectively, the client/proxy TCP connections 230(1)-230(3). The proxy application 250 determines that the HTTP/1.x request 232(3) includes a fire-and-forget header and that the total number of current concurrent offloads is less than the maximum concurrent offloads. Accordingly, as depicted with the bubble numbered 4, the proxy application 250 activates offloading for the HTTP/1.x request 232(3) and transmits the HTTP/1.x response 234(3) having the HTTP status line "200 OK" to the client application 220(1) over the client/proxy TCP connection 230(3).

The proxy application 250 converts the HTTP/1.x requests 232(1)-232(3) to, respectively, the HTTP/2 requests 262(1)-262(3), and attempts to transmit the HTTP/2 requests 262(1)-262(3) to the back-end server 270. Advantageously, the proxy server 240 and the back-end server 270 have previously performed the TCP handshake and the TLS handshake to generate any number of pre-established and pre-authenticated proxy/back-end TCP connections 260. Further, due to the relatively high volume of traffic between the proxy server 240 and the back-end server 270, the proxy/back-end TCP connections 260 are persistent. Consequently, the proxy server 240 begins to transmit the HTTP/2 requests 262(1)-262(3) over the client/proxy TCP connection 230(1) to the back-end server 270 without performing any additional handshakes. More precisely, the proxy server 240 multiplexes the HTTP/2 requests 262(1)-262(3) along with any number of other HTTP/2 requests 262 and/or HTTP/2 responses 264 over the proxy/back-end TCP connection 260(1).

When the client application 220(1) receives the HTTP/1.x response 234(3), the client device 104(1) re-generates (e.g., closes, re-establishes, and re-authenticates) the client/proxy TCP connection 230(3) for the delayed HTTP/1.x request 232(4). In alternate embodiment's, the client device 104(1) may re-use the client/proxy TCP connection 230(3) for the delayed HTTP/1.x request 232(4) without closing, re-establishing, and re-authenticating the client/proxy TCP connection 230(3). The client device 104(1) then begins to transmit the HTTP/1.x request 232(4) to the proxy server 240 via the client/proxy TCP connection 230(3).

Advantageously, the proxy server 240 is physically closer to the client device 104(1) relative to the back-end server 270. As a result, and as depicted with the bubble numbered 5, the proxy application 250 receives the HTTP/1.x request 232(4) before the HTTP/2 requests 262(1)-262(3) reach the back-end server 270. The proxy application 250 converts the HTTP/1.x request 232(4) to the HTTP/2 request 262(4) and attempts to transmit the HTTP/2 request 262(4) to the back-end server 270. The proxy server 240 multiplexes the HTTP/2 request 262(4) with the HTTP/2 requests 262(1)-262(3) and any number of other HTTP/2 requests 262 and/or HTTP/2 responses 264 over the proxy/back-end TCP connection 260(1).

Subsequently, and as depicted with the bubbles numbered 6-8, the back-end server 270 receives the HTTP/2 requests 262(1), 262(2), and 262(4) via the proxy/back-end TCP connection 260(1). Because the HTTP/2 request 262(3) involves an upload, the HTTP/2 request 262(3) requires a longer period of time to reach the back-end server 270. The back-end server 270 processes the HTTP/2 requests 262(1), 262(2), and 262(4) and generates, respectively, the HTTP/2 responses 264(1), 264(2), and 264(4). The back-end server 270 initiates the transmission of the HTTP/2 responses 264(1), 264(2), and 264(4) to the proxy application 250 over the proxy/back-end TCP connection 260(1).

As depicted with the bubbles number 9-11, the proxy application 250 successfully receives the HTTP/2 responses 264(1), 264(2), and 264(4) over the proxy/back-end TCP connection 260(1). Because offloading is not active for the HTTP/1.x requests 234(1), 232(2), and 232(4), the proxy application 250 converts the HTTP/2 responses 264(1), 264(2), and 264(4) to, respectively, the HTTP/1.x responses 234(1), 234(2), and 234(4). The proxy application 250 then initiates the transmission of the HTTP1.x response 234(1) over the client/proxy TCP connection 230(1), the transmission of the HTTP1.x response 234(2) over the client/proxy TCP connection 230(2), and the transmission of the HTTP1.x response 234(4) over the client/proxy TCP connection 230(3).

While the HTTP/1.x responses 234(1), 234(2), and 234(4) are traveling to the client application 220(1), the back-end server 270 receives the HTTP/2 request 262(3) (depicted with the bubble numbered 12). The back-end server 270 processes the HTTP/2 request 262(3), generates the HTTP/2 response 264(3), and initiates the transmission of the HTTP/2 response 264(3) to the proxy application 250 over the proxy/back-end TCP connection 260(1).

As depicted with the bubbles numbered 13-15 and while the HTTP/2 response 264(3) is traveling to the proxy application 250, the client application 220(1) receives the HTTP/1.x responses 234(1), 234(2), and 234(4). Subsequently, as depicted with the bubble numbered 16, the proxy application 250 receives the HTTP/2 response 264(3). Because offloading is active for the HTTP/1.x request 232(3) and the HTTP/2 response 264(3) indicates that the back-end server 270 successfully processed the HTTP/1.x request 232(3), the proxy application 250 discards the HTTP/2 response 264(3).

For explanatory purposes only, FIGS. 2-3 describe the functionality of the system 100 in the context of TCP connections and specific versions of the HTTP protocol. However, the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques.

As a general matter, the techniques outlined herein are applicable to returning successful generic responses in response to selected requests for network-based services before transmitting the requests to the network-based services. In alternate embodiments, the requests and the responses may comply with any number and type of transmission protocols and be transmitted over any number and type of connections. In general, when responding to an HTTP request received from the client application 220, the proxy application 250 generates or relays the HTTP response to the client application 220 in the HTTP format of the HTTP request. When relaying an HTTP request to the back-end server 270, the proxy application may perform any number of conversion operations on the HTTP request to ensure the most efficient transmission of a version of the HTTP request to the back-end server 270.

For instance, in some alternate embodiments, any number of the client applications 220 implement HTTP/2. When generating the HTTP/2 request 262(x), the client application can add a fire-and-forget header to the HTTP/2 request 262(x) to indicate that the corresponding HTTP/2 response 264(x) is unimportant. The proxy application 250 determines whether to activate offloading for the HTTP/2 request 262(x) based on whether the HTTP/2 request 262(x) has the fire-and-forget header and the maximum concurrent offloads. If offloading is active for the HTTP/2 request 262(x), then the proxy application 250 transmits a successful generic HTTP/2 response 264 to the client application 220. Irrespective of whether offloading is active for the HTTP/2 request 262(x), the proxy application 250 attempts to transmit the HTTP/2 request 262(x) to the back-end server 270. If offloading is active for the HTTP/2 request 262(x), then the proxy application 250 discards any HTTP/2 response 264(x) received from the back-end server 270. If offloading is not active for the HTTP/2 request 262(x) and the proxy application 250 is unable to transmit the HTTP/2 request 262(x) to the back-end server 270, then the proxy application 250 transmits a server error HTTP/2 response to the client application 220. Otherwise, if offloading is not active for the HTTP/2 request 262(x), then the proxy application 250 transmits the HTTP/2 response 264(x) received from the back-end server 270 to the client application 220.

In alternate embodiments, the fire-and-forget header and the persistence header may be specified in any technically feasible fashion and include any amount and type of relevant information. For instance, in some embodiments, the fire-and-forget header does not specify a success code list. In such embodiments, the proxy application 250 may determine whether each HTTP/2 response 264 indicates success in any technically feasible fashion. For example, the proxy application 250 could implement a predetermined success code list. In the same or other embodiments, persistence headers are not implemented and the fire-and-forget header optionally specifies a persistence level.

FIG. 3 is a more detailed illustration of the proxy application 250 of FIG. 2, according to various embodiments of the present invention. For explanatory purposes only, FIG. 3 describes an example of the proxy application 250 written in the Go programming language. However, the techniques described herein are illustrative rather than restrictive, and may be altered without departing from the broader spirit and scope of the invention. In particular, the proxy application 250 may execute any number and type of algorithms and may be written in any number (including one) of technically feasible programming languages and/or scripting languages.

As shown, the proxy application 250 includes, without limitation, an HTTP library layer 310, a fire-and-forget proxy handler 320, any number of handlers 330, and a proxy handler 340. The HTTP library layer 310 is configured to receive each HTTP/1.x request 232 to the proxy server 240 as a different execution thread. Upon receiving the HTTP/1.x request 232(x), the HTTP library layer 310 transfers control of the associated execution thread to a bidirectional pipeline of nested HTTP handlers.

The bidirectional pipeline includes, sequentially in a forward direction, the fire-and-forget proxy handler 320, any number of the handlers 330, and the proxy handler 340. In alternate embodiment's, any number of the handlers 330 may precede the fire-and-forget proxy handler 320 in the pipeline and any number of the handlers 330 may follow the proxy handler 340 in the pipeline.

Each of the HTTP handlers is of a type http.HandlerFunc that has two arguments, an http.ResponseWriter and a pointer to an http. Request. The http. Request is a data structure that represents the HTTP/1.1 request 232(x). The http.responseWriter generates and transmits the HTTP/1.x response 234(x) to the HTTP/1.1 request 232(x). If an HTTP handler writes data to the http.responseWriter, then the http.responseWriter transmits a corresponding HTTP/1.x response 234(x) via the client/proxy TCP connection 230 over which the HTTP/1.1 request 232(x) was received. In addition, various HTTP handlers in the pipeline access an http.Response data structure that represents the HTTP response to the HTTP/1.1 request 232(x).

Each of the HTTP handlers may perform any number and type of operations associated with the HTTP/1.1 request 232(x) and/or the HTTP/2 request 262(x) via the http.Request. Similarly, each of the HTTP handlers may perform any number and type of operations associated with the HTTP/.1 response 234(x) and/or the HTTP/2 response 264(x) via the http.Response. Each of the HTTP handlers may also write to the http.responseWriter, transfer control to the next HTTP handler in the pipeline in either direction, stop control propagating through the pipeline, etc.

When the execution thread associated with the HTTP/1.1 request 232(x) enters the HTTP library layer 310, the HTTP library layer 310 generates the http.responseWriter and the http.Request representing the HTTP/1.1 request 232(x). The HTTP library layer 310 then transfers control to the first HTTP handler in the pipeline to initiate a propagation in the forward direction In the embodiment depicted in FIG. 3, the first HTTP handler in the pipeline is the fire-and-forget handler 320.

As shown, the fire-and-forget handler 320 includes, without limitation, an HTTP header trigger 324, a maximum concurrent offloads 322, and offloading operations 326. The HTTP header trigger 324 specifies the name "Fire-and-Forget" that distinguishes a fire-and-forget header. The maximum concurrent offloads 322 specifies the maximum number of HTTP/1.x requests 232 (i.e., threads) for which offloading can be active at any given time. The offloading operations 326 are the operations in the fire-and-forget handler 320 that execute when offloading is active for the execution thread.

When the fire-and-forget handler 320 receives control of the execution thread, the fire-and-forget handler 320 determines whether the HTTP/1.1 request 232(x) includes a fire-and-forget header based on the HTTP header trigger 324. If the fire-and-forget handler 320 determines that the HTTP/1.1 request 232(x) does not include a fire-and-forget header, then the fire-and-forget handler 320 acts as a pass-through in the forward direction. More precisely, the fire-and-forget handler 320 transfers control to the handler 330(1) that is next in the pipeline in the forward direction without executing the offloading operations 326.

If, however, the fire-and-forget handler 320 determines that the HTTP/1.1 request 232(x) includes a fire-and-forget header, then the fire-and-forget handler 320 determines whether to activate offloading for the HTTP/1.1 request 232(x) based on the maximum concurrent offloads 322. In general, the fire-and-forget handler 320 limits the total number of HTTP/1.1 requests 232 for which offloading is active to the maximum concurrent offloads 322.

The fire-and-forget handler 320 may track and limit the total number of HTTP/1.x requests 232 for which offloading is active in any technically feasible fashion. For instance, in some embodiments, fire-and-forget handler 320 may use concurrency features of the GO language (e.g., channels) to limit the total number of threads for which offloading is active at any given time. In other embodiments, the fire-and-forget handler 320 may maintain a count of the execution threads for which offloading is active and compare the count to the maximum concurrent offloads 322. If the count is equal to the maximum concurrent offloads 322, then the fire-and-forget handler 320 does not enable offloading for the HTTP/1,1 request 232(x) and acts as a pass-through.in the forward direction. More precisely, the fire-and-forget handler 320 transfers control to the handler 330(1) that is next in the pipeline in the forward direction without executing the offloading operations 326.

In alternate embodiments, the fire-and-forget handler 320 may activate offloading for the HTTP/request 232(x) in any technically feasible fashion. For instance, the fire-and-forget handler 320 may initialize an offload flag associated with the HTTP/request 232(x) to false. If the HTTP/request 232(x) includes a fire-and-forget header and the total number of HTTP requests for which offloading is active is less than the maximum concurrent offloads 322, then the fire-and-forget handler 320 sets the offload flag to true. If the offload flag is false, then the fire-and-forget handler 320 does not execute the offloading operations 326. Otherwise, the fire-and-forget handler 320 executes the offloading operations 326.

If the fire-and-forget handler 320 retains control of the execution thread, then offloading is active for the HTTP/1,1 request 232(x) and the fire-and-forget handler 320 begins to execute the offloading operations 326. The fire-and-forget handler 320 generates the successful generic HTTP/1.x response 234(x). The fire-and-forget handler 320 then writes the successful generic HTTP/1.x response 234(x) to the http.responseWriter. In response, the http.responseWriter transmits the successful generic HTTP/1.x response 234(x) via the client/proxy TCP connection 230 over which the HTTP/1.1 request 232(x) was received. Note that writing to the http.responseWriter is a non-blocking operation with respect to the execution thread. After writing to the http.responseWriter, the fire-and-forget handler 320 transfers control of the execution thread to the handler 330(1) that is next in the pipeline in the forward direction.

Each of the handlers 330 may perform any number and type of operations before transferring control of the execution thread to the next HTTP handler in the pipeline. When the control of the execution thread is transferred to the proxy handler 340, the proxy handler 340 converts the HTTP/1.x request 232(x) to the HTTP/2 request 262(x). The proxy handler 340 then attempts to transmit the HTTP/2 request 262(x) to the back-end server 270. Transmitting the HTTP/2 request 262(x) to the back-end server 270 blocks the execution thread until the proxy handler 340 receives the HTTP/2 response 264(x) or the proxy handler 340 determines that the back-end server 270 is unable to transmit a corresponding HTTP/2 response. If the proxy handler 340 determines that the back-end server 270 is unable to transmit a corresponding HTTP/2 response, then the proxy handler 340 generates the server error HTTP/2 response 264(x) having a status code that is not included in the success code list associated with the HTTP/1.x request 232(x). Subsequently, the proxy handler 340 returns control of the execution thread to the HTTP handler from which the proxy handler 340 received control, thereby initiating a propagation of the pipeline in the reverse direction.

When control of the execution thread is returned to the fire-and-forget handler 320, the fire-and-forget handler 320 resumes executing either outside or within the offloading operations 326. If offloading is not active for the HTTP/request 232(x), then the fire-and-forget handler 320 resumes executing outside the offloading operations 326. The fire-and-forget handler 320 converts the HTTP/2 response 264(x) to the HTTP/1.x response 234(x). The fire-and-forget handler 320 then writes the HTTP/1.x response 234(x) to the http.responseWriter. In response, the http.responseWriter transmits the HTTP/1.x response 234(x) via the client/proxy TCP connection 230 over which the HTTP/1.x request 232(x) was received.

If, however, offloading is active for the HTTP/1.x request 232(x), then the fire-and-forget handler 320 resumes executing within the offloading operations 326. If the status code of the HTTP/2 response 264(x) indicates success, then the fire-and-forget handler 320 terminates the execution thread. Otherwise, the fire-and-forget handler 320 executes the error handling procedure corresponding to the persistence level associated with the HTTP/1.x request 232(x).

As described previously herein, if the status code of the HTTP/2 response 264(x) matches one of the status codes included in the success code list associated with the HTTP/1.x request 232(x), then the fire-and-forget handler 320 determines that the HTTP/2 response 264(x) indicates success. Otherwise, the fire-and-forget handler 320 determines that the HTTP/2 response 264(x) does not indicate success. In general, the back-end server 270 may include any status code in the HTTP/2 response 264(x). Consequently, if the HTTP/2 response 264(x) is generated by the back-end server 270, then the HTTP/2 response 264(x) may or may not indicate success as per the success code list. By contrast, if the HTTP/2 response 264(x) is generated by the proxy handler 340 to indicate that the back-end server 270 was unable to respond to the HTTP/2 request 262(x), then the HTTP/2 response 264(x) does not indicate success as per the success code list.

As part of executing the error handling procedure, the fire-and-forget handler 320 may cause the execution thread to repeatedly propagate back and forth between the fire-and-forget handler 320 and the proxy handler 340. The error handling procedure eventfully terminates the execution thread.

It will be appreciated that the proxy application 250 described herein is illustrative and that variations and modifications are possible. For instance, in alternate embodiments, the fire-and-forget handler 320 may indicate to the proxy handler 340 whether offloading is active for the HTTP/request 232(x) in any technically feasible fashion. If offloading is not active for the HTTP/request 232(x), then the proxy handler 340 generates and writes the HTTP/1.x response 234(x) to the http.responseWriter. The proxy handler 340 then terminates the execution thread.

For explanatory purposes only, FIG. 3 depicts the control of the execution thread associated with the HTTP/1.x request 232(3) of FIG. 2 that is received from the client application 220(1) as a series of numbered bubbles. The HTTP/1.x request 232(3) includes, without limitation, a request line, a HOST header, a fire-and-forget header, and a body. The request line specifies the POST method, the request target "/upload," and the protocol version HTTP/1.1. The POST method sends the body of the HTTP/1.x request 232(3) (not shown) to the back-end server 270 to create or modify the request target "/upload." The HOST header specifies the domain name "www.XYZ.com" of the back-end server 270. The fire-and-forget header specifies the name "Fire-and-Forget" and the success code list that includes the status code of 200. Because the HTTP/1.x request 232(3) does not include a persistence header, the HTTP/1.x request 232(3) is associated with the default persistence level of high.

As depicted with the bubble numbered 1, the execution thread associated with the HTTP/1.x request 232(3) enters the HTTP library layer 310. The HTTP library layer 310 generates the http.responseWriter and the http.Request that represents the HTTP/1.x request 232(3) and then transfers control to the fire-and-forget handler 320. Because the HTTP/1.x request 232(3) includes a fire-and-forget header, the fire-and-forget handler 320 determines whether to activate offloading for the HTTP/1.x request 232(3) based the maximum concurrent offloads 322. For explanatory purposes only, the total number of HTTP/1.x requests 232 for which offloading is active is less than the maximum concurrent offloads 322. Therefore, the fire-and-forget handler 320 activates offloading for the HTTP/1.x request 232(3) and begins to execute the offloading operations 326.

As depicted with the bubble numbered 2, the fire-and-forget handler 320 configures the http.responseWriter to transmit the successful generic HTTP response 234(x) to the client application 220(1) in a non-blocking manner. The fire-and-forget handler 320 then causes the execution thread to propagate through the pipeline in a forward direction until the proxy handler 340 receives control of the execution thread. The proxy handler 340 converts the HTTP/1.x request 232(3) to the HTTP/2 request 262(3).

As depicted with the bubble numbered 3, the proxy handler 340 transmits the HTTP/2 request 262(3) to the back-end server 270. The execution thread then receives the HTTP/2 response 264(3) specifying a "504 Gateway Timeout" HTTP status line depicted with the bubble numbered 4). Subsequently, the proxy handler 340 causes the execution thread to propagate through the pipeline in a reverse direction until reaching the fire-and-forget handler 320.

The fire-and-forget handler 320 resumes execution within the offloading operations 326. Because the HTTP/2 response 264(3) does not specify a successful status code, the fire-and-forget handler 320 executes the error handler process corresponding to the persistence level of high. More specifically and as depicted with the bubble numbered 5, the fire-and-forget handler 320 performs a re-transmission attempt 328. To execute the re-transmission attempt 328, the fire-and-forget handler 320 transfers control of the execution thread to the proxy handler 320(1), and the execution thread re-propagates through the pipeline in a forward direction until reaching the proxy handler 340.

As depicted with the bubble numbered 6, the proxy handler 340 attempts to re-transmit the HTTP/2 request 262(3) to the back-end server 270. Subsequently and as depicted with the bubble numbered 7, the proxy handler 340 receives the HTTP/2 response 264(3') specifying the HTTP status line of "200 OK." The proxy handler 340 causes the execution thread to re-propagate through the pipeline in a reverse direction until reaching the fire-and-forget handler 320. The fire-and-forget handler 320 resumes executing within the error handling process. Because the status code of the HTTP/2 response 264(3') indicates success, the fire-and-forget handler 320 terminates the execution thread.

Note that the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques. In particular, the functionality of the proxy application 250 may be implemented in any technically feasible fashion. For instance, in alternate embodiments, the proxy application 250 may include any number (including one) and type of functions instead of the pipeline of HTTP handler functions.

FIG. 4 is a flow diagram of method steps for processing a request associated with a network-based service, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 402, where the proxy application 250 receives an HTTP request from one of the client applications 220. The HTTP request may be in an HTTP/1.x format (i.e., the HTTP/1.x request 232(x)) or in the HTTP/2 format (i.e., the HTTP/2 request. 262(x)). At step 404, the fire-and-forget handler 320 determines whether to activate offloading for the HTTP request based on whether the HTTP request includes a fire-and-forget header and, optionally, the maximum concurrent offloads 322 At step 406, the fire-and-forget handler 320 determines whether offloading is active for the HTTP request. If, at step 406, the fire-and-forget handler 320 determines that offloading is active for the HTTP request, then the method 400 proceeds to step 408.

At step 408, the fire-and-forget handler 320 transmits a successful generic HTTP response in the version of HTTP associated with the HTTP request to the client application 220. At step 410, the proxy handler 340 attempts to transmit the HTTP/2 request 262 corresponding to the HTTP request to the back-end server 270. The HTTP/2 request 262 corresponding to the HTTP request may be the HTTP request. At step 412, the fire-and-forget handler 320 determines whether the proxy handler 340 received the HTTP/2 response 264 indicating success. If, at step 412, the fire-and-forget handler 320 determines that the proxy handler 340 received the HTTP/2 response 264 indicating success, then the method 400 terminates.

If, however, at step 412, the fire-and-forget handler 320 determines that the proxy handler 340 did not receive the HTTP/2 response 264 indicating success, then the method 400 proceeds to step 414. At step 414, the fire-and-forget handler 320 executes an error handling process based on the persistence level. The persistence level is either specified in a persistence header of the HTTP request or is equal to a default persistence level. The error handling process may involve any number (including zero) of re-transmission attempts 328. The method 400 then terminates.

Returning now to step 408, if the fire-and-forget handler 320 determines that offloading is not active for the HTTP request, then the method 400 proceeds directly to step 416. At step 416, the proxy handler 340 attempts to transmit the HTTP/2 request 262 corresponding to the HTTP request to the back-end server 270. The HTTP/2 request 262 corresponding to the HTTP request may be the HTTP request.

At step 418, the proxy handler 340 determines whether the corresponding HTTP/2 response 264 was received from the back-end server 270. If, at step 418, the proxy handler 340 determines that the corresponding HTTP/2 response 264 was received from the back-end server 270, then the method 400 proceeds directly to step 422 If, at step 418, the proxy handler 340 determines that the corresponding HTTP/2 response 264 was not received from the back-end server 270, then the method 400 proceeds to step 420. At step 420, the proxy handler 340 generates the server error HTTP/2 response 264 and the method 400 proceeds to step 422.

At step 422, the fire-and-forget handler 320 sends a version of the HTTP/2 response 264 to the client application 220. If the HTTP request received from the client application 220 is in the HTTP/2 format, then the fire-and-forget handler 320 transmits the HTTP/2 response 264 to the client application 220. Otherwise, the fire-and-forget handler 320 converts the HTTP/2 response 264 to the HTTP/1.x response 234 and transmits the HTTP/1.x response 234 to the client application 220. The method 400 then terminates.

In sum, using the disclosed techniques, a proxy application may enable a client application that implements HTTP/1.x over TCP to efficiently interact with a back-end server to access a network-based service. The client application can add a "fire-and-forget" header to an HTTP request for an informational upload to indicate that the corresponding HTTP response is unimportant. The fire-and-forget header specifies a success code list of status codes that are to be considered successful. The fire-and-forget header is associated with a default persistence level, and the client application can also add a "persistence" header to the HTTP request that explicitly specifies a persistence level. The persistence level correlates to the level of importance for the back-end server receiving the HTTP request.

The proxy application executes on a proxy server that acts as an intermediary between the client application and the back-end server. Upon receiving an HTTP request from the client application, the proxy application determines whether to activate offloading for the HTTP request. If the HTTP request has a fire-and-forget header and a maximum number of concurrent offloads has not been reached, then the proxy application activates offloading for the HTTP request. Otherwise, the proxy application does not activate fire-and-forget for the HTTP request.

If offloading is active for the HTTP request, then the proxy application transmits a successful generic HTTP response to the client. The successful generic HTTP response specifies one of the status codes included in the success code list, thereby intentionally and erroneously indicating that the back-end server has successfully received and processed the HTTP request. The proxy application then attempts to transmit an HTTP/2 version of the HTTP request to a back-end server. If the proxy application receives an HTTP/2 response indicating success as per the success code list, then the proxy application discards the HTTP/2 response. Otherwise, the proxy application executes an error handling process based on the persistence level. The error handling process can involve any number of re-transmission attempts.

If offloading is not active for the HTTP request, then the proxy application attempts to transmit an HTTP/2 version of the HTTP/1.x request to the back-end server. If the proxy application does not receive an HTTP/2 response from the back-end server, then the proxy application transmits a server error HTTP/1.x response to the client application. Otherwise, the proxy application transmits an HTTP/1.x version of the HTTP/2 response received from the back-end server to the client application.

At least one technical advantage of the disclosed techniques relative to the prior art is that, with the disclosed techniques, interactive HTTP transactions are less likely to be delayed by informational HTTP transactions for a client application that implements HTTP/1.x over TCP. In particular, as soon as the proxy server responds to an informational HTTP transaction transmitted from the client application, the client application can close or reuse the associated TCP connection without having to wait for a response from the back-end server. Accordingly, the client application is less likely to use all available TCP connections for informational HTTP transactions and delay the transmission and processing of interactive HTTP transactions. Furthermore, because the proxy server subsequently attempts to upload the information associated with an informational HTTP transaction to the back-end server, the likelihood that the information ends up being dropped is not increased. And since the proxy server communicates with the back-end server via HTTP/2 using pre-established and pre-authenticated TCP connections, communication times between the client application and the back-end server are shortened. These technical advantages represent one or more technological advancements over prior art approaches.

1. In some embodiments, a method comprises determining that a first request received from a client application indicates a response to the first request can be offloaded from a server machine; and prior to transmitting the first request to the server machine, transmitting a first response to the first request to the client application indicating that the server machine has successfully processed the first request, wherein, upon receiving the first response, the client application is able to initiate a second request.

2. The method of clause 1, wherein the first request includes a status code that indicates that the server machine has successfully processed the first request.

3. The method of clauses 1 or 2, wherein the first request is associated with Hypertext Transmission Protocol (HTTP)/1.x, and transmitting the first request to the server machine comprises generating a second request associated with HTTP/2 based on the first request; and multiplexing the second request along with at least a third request associated with HTTP/2 over a first Transmission Control Protocol (TCP) connection to the server machine.

4. The method of any of clauses 1-3, further comprising determining that the server machine has not successfully processed the first request; determining that the first request indicates a first persistence level; and performing one or more error-handling operations based on the first persistence level, wherein the one or more error-handling operations cause the server machine to successfully process the first request.

5. The method of any of clauses 1-4, wherein determining that the first request indicates a first persistence level comprises determining that the first request includes a header portion specifying a value for a persistence parameter that corresponds to the first persistence level.

6. The method of any of clauses 1-5, where the first request includes informational data that is being uploaded to the server machine.

7. The method of any of clauses 1-6, further comprising receiving a second response to the first request from the server machine; and instead of transmitting the second response to the client application, discarding the second response.

8. The method of any of clauses 1-7, wherein the client application receives the first response via a Transmission Control Protocol (TCP) connection and re-uses or re-generates the TCP connection to initiate the second request.

9. The method of any of clauses 1-8, further comprising determining that the second request received from the client application does not indicate that a response to the second request can be offloaded from the server machine; transmitting the second request directly to the server machine; and upon receiving a second response to the second request from the server machine, transmitting the second response to the client application.

10. The method of any of clauses 1-9, wherein determining that the first request indicates the response to the first request can be offloaded comprises identifying that the first request includes a header portion that indicates that the response to the first request is not critical.

11. In some embodiments, a computer-implemented computer-readable storage medium includes instructions that, when executed by a processor, cause the processor to perform the steps of determining that a first request received from a client application can be offloaded from a server machine; and prior to transmitting the first request to the server machine, transmitting a first response to the first request to the client application indicating that the server machine has successfully processed the first request, wherein, upon receiving the first response, the client application is able to initiate a second request.

12. The one or more non-transitory computer readable media of clause 11, wherein the first request is associated with Hypertext Transmission Protocol (HTTP)/1.x, and transmitting the first request to the server machine comprises generating a second request associated with HTTP/2 based on the first request; and multiplexing the second request along with at least a third request associated with HTTP/2 over a first Transmission Control Protocol (TCP) connection to the server machine.

13. The one or more non-transitory computer readable media of clauses 11 or 12, further comprising determining that the server machine has not successfully processed the first request; determining that the first request indicates a first persistence level; and performing one or more error-handling operations based on the first persistence level, wherein the one or more error-handling operations cause the server machine to successfully process the first request.

14. The one or more non-transitory computer readable media of any of clauses 11-13, wherein the one or more error-handing operations comprise one or more write operations that store the first request in a persistent storage.

15. The one or more non-transitory computer readable media of any of clauses 11-14, wherein the first request includes at least one of an event log, a heartbeat indicating that the client application is properly executing, and a metric log.

16. The one or more non-transitory computer readable media of any of clauses 11-15, further comprising receiving a second response to the first request from the server machine; and instead of transmitting the second response to the client application, discarding the second response.

17. The one or more non-transitory computer readable media of any of clauses 11-16, wherein the client application receives the first response via a Transmission Control Protocol (TCP) connection and re-uses or re-generates the TCP connection to initiate the second request.

18. The one or more non-transitory computer readable media of any of clauses 11-17, further comprising determining that the second request received from the client application can be offloaded from the server machine; determining that a current number of concurrent offloads equals a maximum number of concurrent offloads; transmitting the second request directly to the server machine; and upon receiving a second response to the second request from the server machine, transmitting the second response to the client application.

19. The one or more non-transitory computer readable media of any of clauses 11-18, wherein determining that the first request can be offloaded comprises identifying that the first request includes a header portion that indicates that the response to the first request is not critical.

20. In some embodiments, a system comprises one or more memories storing instructions; and one or more processors that are coupled to the one or more memories and, when executing the instructions, are configured to determine that a first request received from a client application via a first connection indicates a response to the first request can be offloaded from a server machine; and prior to transmitting the first request to the server machine, transmit a first response to the first request to the client application indicating that the server machine has successfully processed the first request, wherein, upon receiving the first response, the client application is able to re-use or re-generate the first connection to initiate a second request.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, the method comprising:
   determining that a first request received from a client application indicates a response to the first request can be offloaded from a server machine; and
   prior to transmitting the first request to the server machine, transmitting a first response to the first request to the client application indicating that the server machine has successfully processed the first request,
   wherein, upon receiving the first response, the client application is able to initiate a second request.

2. The method of claim 1, wherein the first request includes a status code that indicates that the server machine has successfully processed the first request.

3. The method of claim 1, wherein the first request is associated with Hypertext Transmission Protocol (HTTP)/1.x, and transmitting the first request to the server machine comprises:
   generating a second request associated with HTTP/2 based on the first request; and
   multiplexing the second request along with at least a third request associated with HTTP/2 over a first Transmission Control Protocol (TCP) connection to the server machine.

4. The method of claim 1, further comprising:
   determining that the server machine has not successfully processed the first request;
   determining that the first request indicates a first persistence level; and
   performing one or more error-handling operations based on the first persistence level, wherein the one or more error-handling operations cause the server machine to successfully process the first request.

5. The method of claim 4, wherein determining that the first request indicates a first persistence level comprises determining that the first request includes a header portion specifying a value for a persistence parameter that corresponds to the first persistence level.

6. The method of claim 1, where the first request includes informational data that is being uploaded to the server machine.

7. The method of claim 1, further comprising:
   receiving a second response to the first request from the server machine; and
   instead of transmitting the second response to the client application, discarding the second response.

8. The method of claim 1, wherein the client application receives the first response via a Transmission Control Protocol (TCP) connection and re-uses or re-generates the TCP connection to initiate the second request.

9. The method of claim 1, further comprising:
   determining that the second request received from the client application does not indicate that a response to the second request can be offloaded from the server machine;
   transmitting the second request directly to the server machine; and
   upon receiving a second response to the second request from the server machine, transmitting the second response to the client application.

10. The method of claim 1, wherein determining that the first request indicates the response to the first request can be offloaded comprises identifying that the first request includes a header portion that indicates that the response to the first request is not critical.

11. One or more non-transitory computer readable media including instructions that, when executed by one or more processors, cause the one or more processors to perform the steps of:
    determining that a first request received from a client application can be offloaded from a server machine; and
    prior to transmitting the first request to the server machine, transmitting a first response to the first request to the client application indicating that the server machine has successfully processed the first request,
    wherein, upon receiving the first response, the client application is able to initiate a second request.

12. The one or more non-transitory computer readable media of claim 11, wherein the first request is associated with Hypertext Transmission Protocol (HTTP)/1.x, and transmitting the first request to the server machine comprises:

generating a second request associated with HTTP/2 based on the first request; and
  multiplexing the second request along with at least a third request associated with HTTP/2 over a first Transmission Control Protocol (TCP) connection to the server machine.

13. The one or more non-transitory computer readable media of claim 11, further comprising:

determining that the server machine has not successfully processed the first request;
  determining that the first request indicates a first persistence level; and
  performing one or more error-handling operations based on the first persistence level, wherein the one or more error-handling operations cause the server machine to successfully process the first request.

14. The one or more non-transitory computer readable media of claim 13, wherein the one or more error-handing operations comprise one or more write operations that store the first request in a persistent storage.

15. The one or more non-transitory computer readable media of claim 11, wherein the first request includes at least one of an event log, a heartbeat indicating that the client application is properly executing, and a metric log.

16. The one or more non-transitory computer readable media of claim 11, further comprising:

receiving a second response to the first request from the server machine; and
  instead of transmitting the second response to the client application, discarding the second response.

17. The one or more non-transitory computer readable media of claim 11, wherein the client application receives the first response via a Transmission Control Protocol (TCP) connection and re-uses or re-generates the TCP connection to initiate the second request.

18. The one or more non-transitory computer readable media of claim 11, further comprising:

determining that the second request received from the client application can be offloaded from the server machine;
  determining that a current number of concurrent offloads equals a maximum number of concurrent offloads;
  transmitting the second request directly to the server machine; and
  upon receiving a second response to the second request from the server machine, transmitting the second response to the client application.

19. The one or more non-transitory computer readable media of claim 11, wherein determining that the first request can be offloaded comprises identifying that the first request includes a header portion that indicates that the response to the first request is not critical.

20. A system, comprising:

one or more memories storing instructions; and
  one or more processors that are coupled to the one or more memories and,
    when executing the instructions, are configured to:
      determine that a first request received from a client application via a first connection indicates a response to the first request can be offloaded from a server machine; and
      prior to transmitting the first request to the server machine, transmit a first response to the first request to the client application indicating that the server machine has successfully processed the first request,
    wherein, upon receiving the first response, the client application is able to re-use or re-generate the first connection to initiate a second request.

\* \* \* \* \*